(12) United States Patent
Jeong

(10) Patent No.: US 9,908,396 B2
(45) Date of Patent: Mar. 6, 2018

(54) UNDER BODY FOR ELECTRIC VEHICLE

(71) Applicants: Hyundai Motor Company, Seoul (KR); Kia Motors Corporation, Seoul (KR)

(72) Inventor: SeungMin Jeong, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/365,832

(22) Filed: Nov. 30, 2016

(65) Prior Publication Data

US 2017/0368924 A1 Dec. 28, 2017

(30) Foreign Application Priority Data

Jun. 22, 2016 (KR) .................. 10-2016-0078227

(51) Int. Cl.
| | |
|---|---|
| *B60K 1/04* | (2006.01) |
| *B62D 21/15* | (2006.01) |
| *B62D 25/20* | (2006.01) |
| *B62D 27/02* | (2006.01) |
| *H01M 2/10* | (2006.01) |

(52) U.S. Cl.
CPC .............. *B60K 1/04* (2013.01); *B62D 21/15* (2013.01); *B62D 25/2036* (2013.01); *B62D 27/02* (2013.01); *H01M 2/1083* (2013.01); *B60K 2001/0438* (2013.01); *B60Y 2200/91* (2013.01); *B60Y 2306/01* (2013.01); *B60Y 2400/112* (2013.01); *B60Y 2410/124* (2013.01); *H01M 2220/20* (2013.01)

(58) Field of Classification Search
CPC .. B60K 1/04; B60K 2001/0438; B62D 21/15; B62D 27/02; B62D 25/2036
See application file for complete search history.

(56) References Cited

U.S. PATENT DOCUMENTS

| | | | | |
|---|---|---|---|---|
| 5,501,289 A | * | 3/1996 | Nishikawa | ............... B60K 1/04 180/65.1 |
| 6,188,574 B1 | * | 2/2001 | Anazawa | ................. B60K 1/04 180/68.5 |

(Continued)

FOREIGN PATENT DOCUMENTS

| | | |
|---|---|---|
| JP | 2004-276788 A | 10/2004 |
| JP | 2015-116972 A | 6/2015 |

(Continued)

*Primary Examiner* — Hau V Phan
(74) *Attorney, Agent, or Firm* — Morgan, Lewis & Bockius LLP

(57) ABSTRACT

An under body may include a side sill inside front panel bent similar to the side sill inside panel to connect a front end portion of the side sill inside panel with a dash panel to be bonded to each other; a front side member connecting member connected with a bottom surface of the dash panel and a rear end portion of a front side member while being bonded to an inside surface of the side sill inside front panel; a side sill inside rear panel configured to connect a rear end portion of the side sill inside panel with a rear side member to be bonded to each other; and a rear side member connecting member configured to connect a bottom end portion of the side sill inside rear panel with a front inside surface of a rear side member to be bonded to each other.

7 Claims, 7 Drawing Sheets

(56) References Cited

U.S. PATENT DOCUMENTS

| | | | |
|---|---|---|---|
| 7,048,321 B2 * | 5/2006 | Bandoh | B60N 2/468 |
| | | | 180/68.5 |
| 8,561,743 B2 * | 10/2013 | Iwasa | B60K 1/04 |
| | | | 180/68.5 |
| 8,696,051 B2 * | 4/2014 | Charbonneau | B62D 21/157 |
| | | | 296/187.12 |
| 8,939,246 B2 * | 1/2015 | Yamaguchi | B60K 1/04 |
| | | | 180/311 |
| 9,160,042 B2 * | 10/2015 | Fujii | B60K 1/04 |
| 2007/0007060 A1 * | 1/2007 | Ono | B60K 1/04 |
| | | | 180/65.31 |
| 2012/0018238 A1 * | 1/2012 | Mizoguchi | B60K 1/04 |
| | | | 180/68.5 |
| 2014/0284125 A1 * | 9/2014 | Katayama | B60K 1/04 |
| | | | 180/68.5 |
| 2014/0338998 A1 * | 11/2014 | Fujii | B60K 1/04 |
| | | | 180/68.5 |
| 2015/0136504 A1 * | 5/2015 | Tsujimura | H01M 2/1077 |
| | | | 180/68.5 |
| 2015/0360550 A1 | 12/2015 | Berger et al. | |

FOREIGN PATENT DOCUMENTS

| | | |
|---|---|---|
| KR | 10-1997-0001051 A | 1/1997 |
| KR | 20-1998-0016792 U | 6/1998 |
| KR | 10-2013-0101891 A | 9/2013 |
| KR | 10-1325380 B1 | 10/2013 |

\* cited by examiner

D-D

UNDER BODY FOR ELECTRIC VEHICLE

CROSS-REFERENCE TO RELATED APPLICATION

The present application claims priority to Korean Patent Application No. 10-2016-0078227 filed on Jun. 22, 2016, the entire contents of which is incorporated herein for all purposes by this reference.

BACKGROUND OF THE INVENTION

Field of the Invention

The present invention relates to an under body for an electric vehicle. More The present invention relates to an under body for an electric vehicle capable of ensuring collision performance of the electric vehicle and rigidity of a vehicle body.

Description of the Related Art

In general, an electric vehicle is propelled by an electric motor receiving energy from a battery to be operated.

For example, the electric vehicle may include a plug-in hybrid electric vehicle (PHEV), a battery electric vehicle (BEV), and a fuel cell electric vehicle (FCEV).

In the above electric vehicle, a vehicle body is equipped with a high voltage battery pack (hereinafter, referred to as 'battery pack') which is an aggregation of a battery module. The electric vehicle may run by using a drive motor receiving power from the battery pack to be operated as a power source.

Since a volume and a weight of the battery are significantly great, in order to mount the battery in the vehicle body, there is a need to suitably ensure a mounting space in the vehicle body.

The above battery pack is mounted in a floor panel interposed between both side sills of an under body in the vehicle body.

For example, the battery pack is mounted on the floor panel through various mounting units such as a bracket.

However, since an under body for an electric vehicle equipped with a battery pack according to the related art needs a separate mounting unit for mounting a battery case at a floor panel side, the number of components and an assembling process for assembling the mounting unit are increased, and a weight of the vehicle body may be increased.

Accordingly, since the under body for the electric vehicle needs an application section of a component such as a mounting unit for mounting the battery pack on the floor panel, and an application section such as a gap for suppressing noise occurrence between the battery case and the floor panel, the under body for the electric vehicle is advantageous in terms of a disposing freedom degree of the battery pack, and there is a limitation to increase a capacity of the battery pack.

Further, since the under body for the electric vehicle is simply supported at the floor panel side through the mounting unit, when external impact is applied to the under body so that collision accident occurs, ensuring safety and durability with respect collision load is insufficient so that the battery pack may be easily damaged due to the external impact.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a under body for an electric vehicle having advantages of improving collision performance by ensuring rigidity of a vehicle body while sufficiently ensuring an installation space of a battery pack by improving a connection structure of a side sill between a front side member and a rear side member.

Various aspects of the present invention are directed to providing a under body for an electric vehicle for forming a mounting space of a battery by assembling left and right side sill inside panels of the electric vehicle on a center floor panel, wherein the side sill inside panel is formed therein with a stepped portion to be bent from a top side in a state that the center floor panel is placed in a vehicle height direction, the stepped portion including a first welding surface corresponding to a vehicle width direction, and a second welding surface connected with the first welding to correspond to a vehicle height direction, and both end portions of the center floor panel are bonded to the first welding surface and the second welding surface, respectively, the under body including: a side sill inside front panel bent similar to the side sill inside panel to connect a front end portion of the side sill inside panel with a dash panel to be bonded to each other; a front side member connecting member connected with a bottom surface of the dash panel and a rear end portion of a front side member while being bonded to an inside surface of the side sill inside front panel; a side sill inside rear panel configured to connect a rear end portion of the side sill inside panel with a rear side member to be bonded to each other; and a rear side member connecting member configured to connect a bottom end portion of the side sill inside rear panel with a front inside surface of a rear side member to be bonded to each other.

Further, the side sill inside panel may be formed therein with a plurality of mounting holes spaced apart from each other by a predetermined distance at a bottom surface of the side sill inside panel in a longitudinal direction.

Further, the side sill inside panel may be formed therein with front and rear cutaway portions, and predetermined sections of front and rear end portions of the front and rear cutaway portions may be cut.

The side sill inside front panel may have a shape with a predetermined cut section corresponding to the front cutaway portion of the side sill inside panel, and may be welded along the front cutaway portion in an overlapped state.

The side sill inside rear panel may have a shape with a predetermined cut section corresponding to the rear cutaway portion of the side sill inside panel, and may be welded along the rear cutaway portion in an overlapped state.

The front side member connecting member may be bonded to a bottom surface of the sill inside front panel, a bottom surface of the dash panel, and the rear end portion of the front side member, respectively.

The rear side member connecting member may be spot-welded to a bottom surface of the side sill inside panel, a bottom surface of the side sill inside rear panel, and a front inside surface of the rear side member, respectively.

An exemplary embodiment of the present invention can safely protect riders and a battery pack by improving absorption performance of collision energy through additional configurations of a side sill inside front panel, a front side member connecting member, a side sill inside rear panel, and a rear side member connecting member in a connection structure of a side sill inside panel of a side sill for connecting a front side member with a rear side member.

Further, an exemplary embodiment of the present invention may achieve a robust structure by increasing rigidity of a bonding part by bonding a side sill inside panel and a center floor panel in a vehicle width direction and a vehicle height direction while placing the center floor panel in the vehicle height direction by forming a bent stepped portion on the side sill inside panel.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
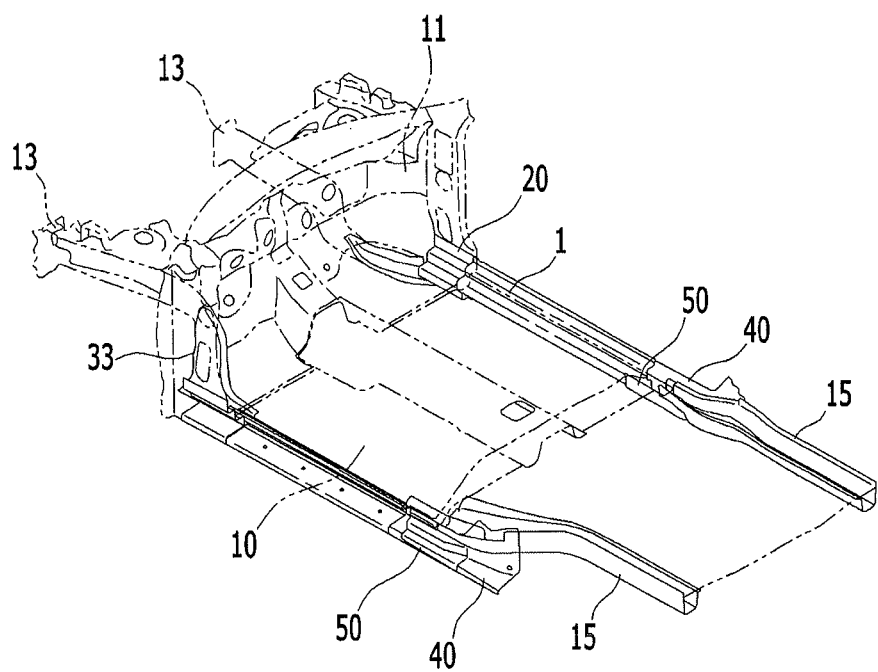
FIG. 1 is a perspective view illustrating a under body for an electric vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings. Following drawings and a detailed description to be described later relate to one of various exemplary embodiments to efficiently describe characteristics of the present invention. Accordingly, the present invention is not limited to following drawings and description.

Referring to FIG. 1, a under body for an electric vehicle according to an exemplary embodiment of the present invention may ensure a battery mounting space at a lower portion of a center floor panel 10 by assembling the center floor panel 10 between both side sills including a side sill inside panel 1 and a side sill outside panel of a vehicle.

Further, the side sill inside panel 1 has a connection structure at a dash panel 11, a front side member 13, and a rear side member 15 through a side sill inside front panel 20, a front side member connecting member 30, a side sill inside rear panel 40, and a rear side member connecting member 50.

Figure 2:
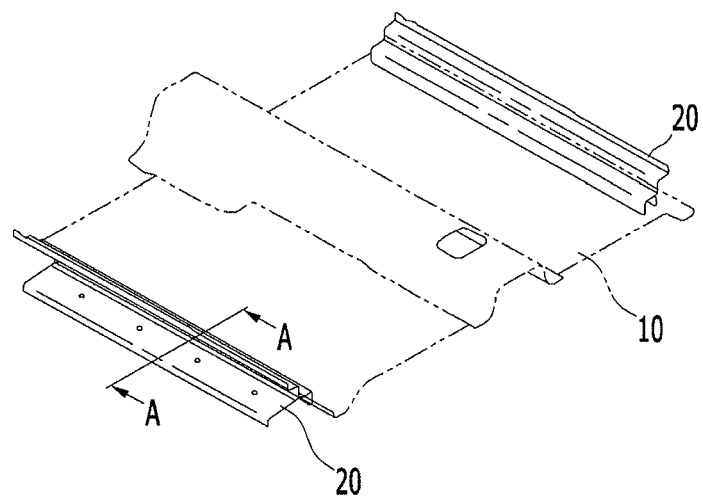
FIG. 2 is a perspective view illustrating a side sill inside panel which is applied to the under body for an electric vehicle according to an exemplary embodiment of the present invention.
Figure 2:
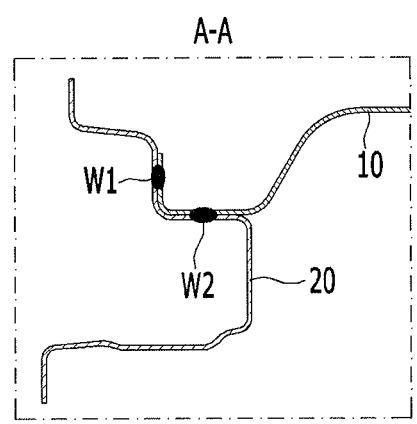

Referring to FIG. 2, the side sill inside panel 1 is formed therein with a stepped portion to be bent from a top side, and the center floor panel 10 is placed in a vehicle height direction through the stepped portion 3.

The stepped portion 3 includes a first welding surface W1 corresponding to a vehicle width direction, and a second welding surface W2 connected to the first welding surface W1 to correspond to a vehicle height direction.

That is, in both side sill inside panels 1, both end portions of the center floor panel 10 are welded to the first welding surface W1 and the second welding surface W2 while being placed on the stepped portion 3, respectively.

Further, a plurality of mounting holes 7 are spaced apart from each other by a predetermined distance in the side sill inside panel 1 in a longitudinal direction.

The mounting hole 7 serves to fix a battery pack 60 by installing a battery mounting member after mounting the battery pack 60 at a lower surface of the center floor panel 10. (With reference to FIG. 6)

In addition, the side sill inside panel 1 may be formed therein with front and rear cutaway portions 5. Predetermined sections of front and rear end portions of the front and rear cutaway portion 5 are cut.

Figure 3:
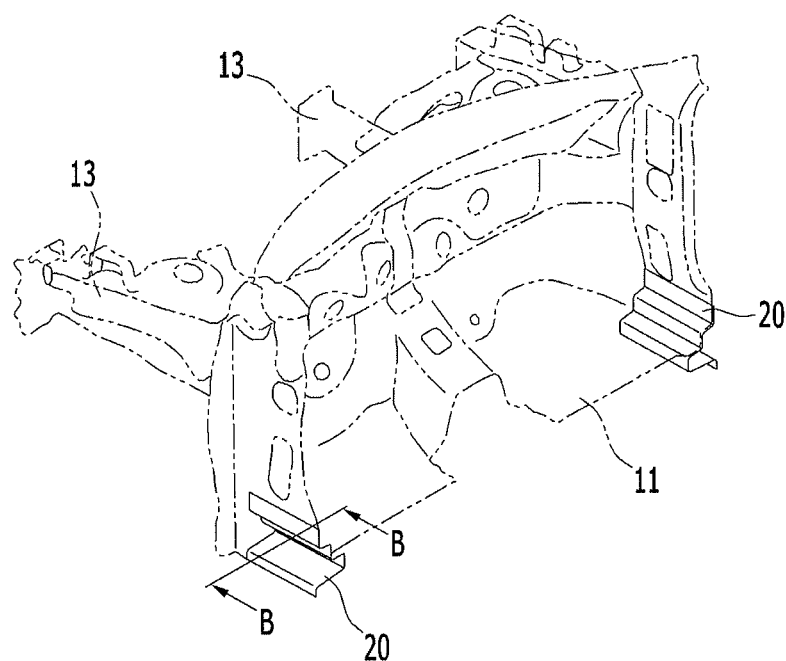
FIG. 3 is a perspective view illustrating a side sill inside front panel which is applied to the under body for an electric vehicle according to an exemplary embodiment of the present invention.
Figure 3:
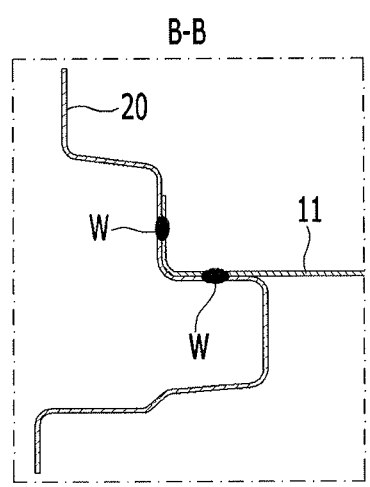

Referring to FIG. 3, the side sill inside front panel 20 is bent similar to the side sill inside panel 1.

The side sill inside front panel 20 is welded to a front end portion of the side sill inside panel 1 and a dash panel 11.

Moreover, the side sill inside front panel 20 has a shape with a predetermined cut section corresponding to the front cutaway portion of the side sill inside panel 1.

The side sill inside front panel 20 is welded along the front cutaway portion in an overlapped state.

Figure 4:
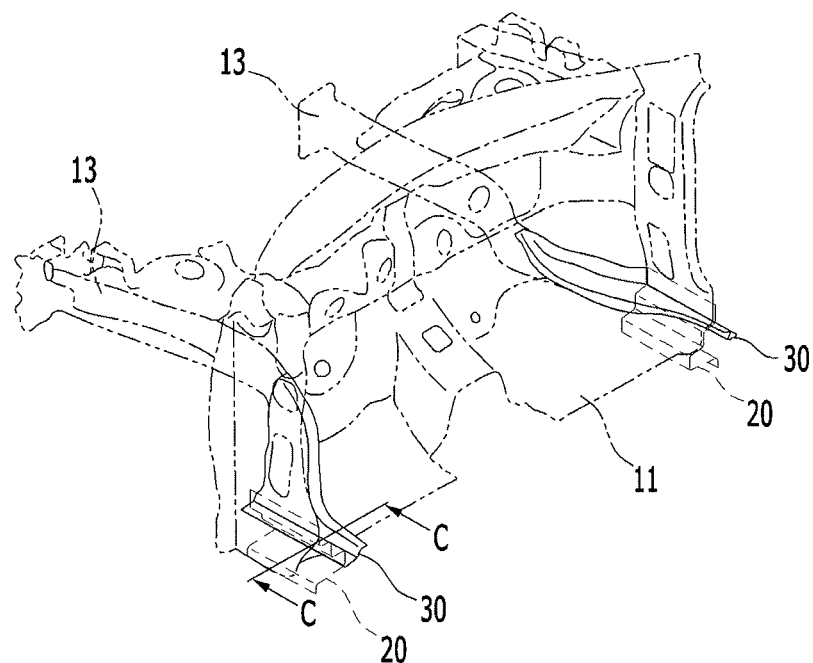
FIG. 4 is a perspective view illustrating a front side member connecting member which is applied to the under body for an electric vehicle according to an exemplary embodiment of the present invention.
Figure 4:
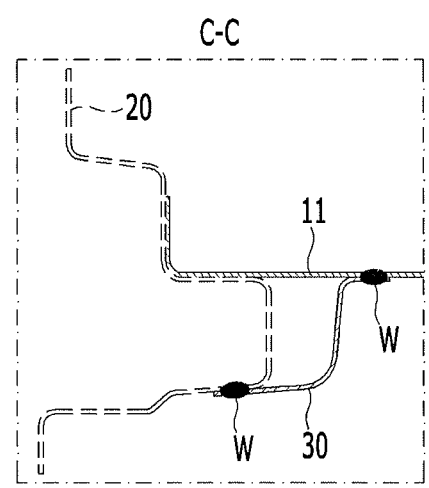

Referring to FIG. 4, the front side member connecting member 30 is bonded to an inside surface of the side sill inside front panel 20.

The front side member connecting member 30 is connected with a bottom surface of the dash panel 11 and a rear end portion of the front side member 13.

That is, the front side member connecting member 30 is spot-welded to a bottom surface of the side sill inside front panel 20, a bottom surface of the dash panel 11, and a rear end portion of the front side member 13, respectively.

Figure 5:
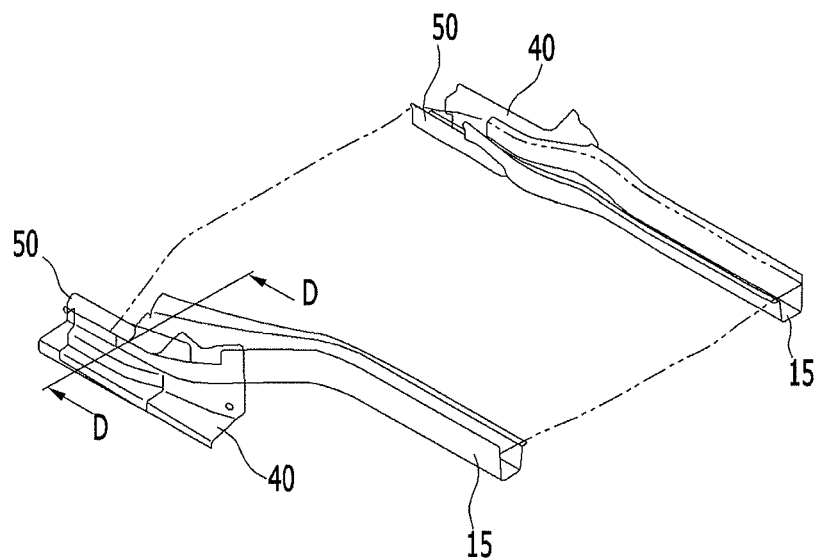
FIG. 5 is a perspective view illustrating a side sill inside rear panel and a rear side member connecting member which are applied to the under body for an electric vehicle according to an exemplary embodiment of the present invention.
Figure 5:
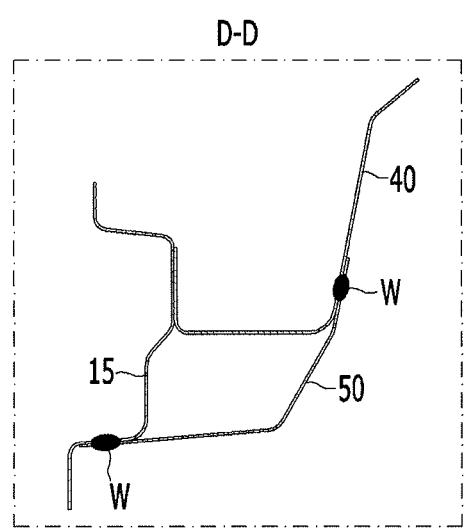

Referring to FIG. 5, the side sill inside rear panel 40 is welded to a rear end portion of the side sill inside panel 1 and a rear side member 15.

Furthermore, the side sill inside rear panel 40 has a shape with a predetermined cut section corresponding to the rear cutaway portion of the side sill inside panel 1.

The side sill inside rear panel 40 is welded along the rear cutaway portion in an overlapped state.

Further, the rear side member connecting member 50 connects a bottom end portion of the side sill inside rear panel 40 with a front inside surface of the rear side member 15 to be bonded to each other.

That is, the rear side member connecting member 50 is spot-welded to a bottom surface of the side sill inside panel 1, a bottom surface of the side sill inside rear panel 40, and a front inside surface of the rear side member 15, respectively.

Figure 6:
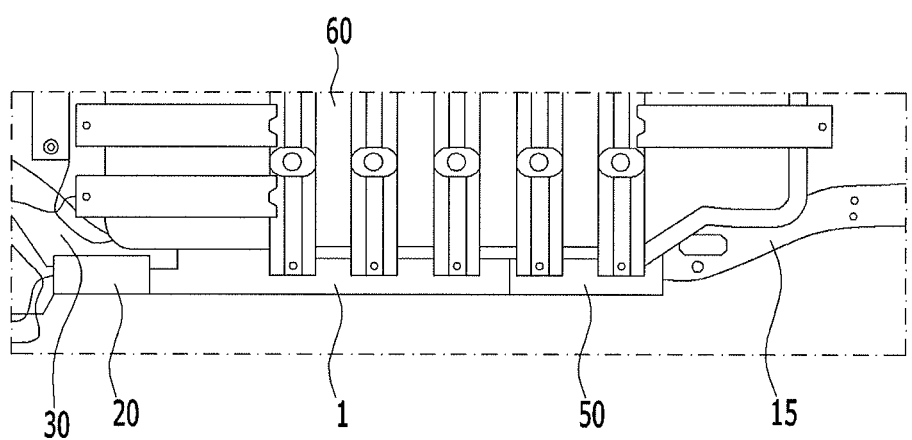
FIG. 6 is a partially cut-away, bottom view illustrating a state of the under body for an electric vehicle according to an exemplary embodiment of the present invention on which a battery pack is mounted.

Referring to FIG. 6, a side sill inside panel 1 at left and right sides is supported through a plurality of battery mounting members 70 by placing a battery pack 60 in a battery mounting space bonded to the center floor panel 10.

The plurality of battery mounting members 70 is engaged with the side sill inside panel 1 and the rear side member connecting member 50 to support the battery pack 60.

Figure 7:
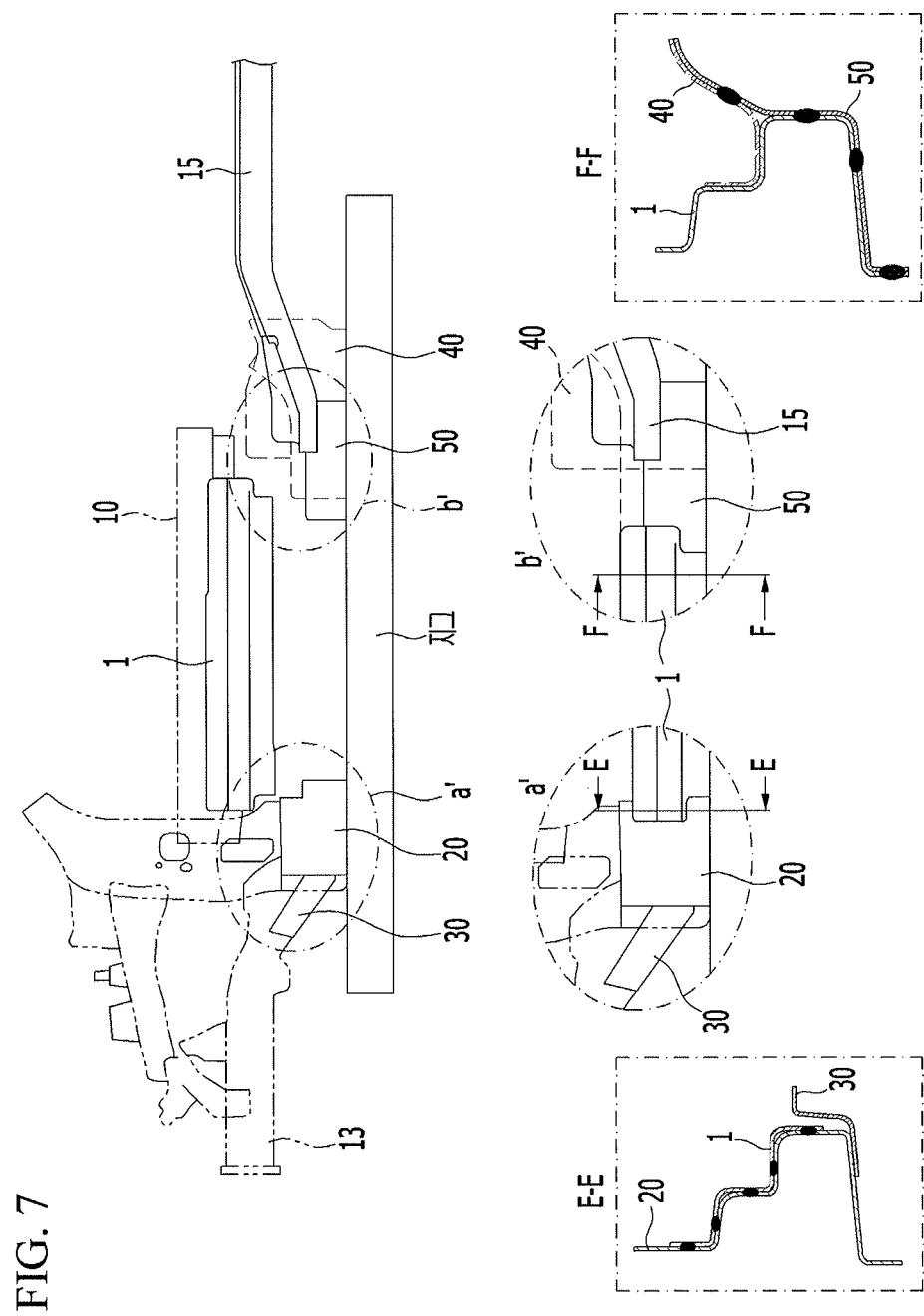
FIG. 7 is an assembly process illustrating the under body for an electric vehicle according to an exemplary embodiment of the present invention.

Referring to FIG. 7, the under body for the electric vehicle configured as above prevents interference by front and rear cutaway portions of the side sill inside panel 1 connected with the center floor panel 10 and is engaged in a vehicle width direction in a state that a front floor complementary part configured by assembling a side sill inside front panel 20, a front side member connecting member 30, a dash panel 11 and a front side member 13, and a rear floor complementary part configured by assembling a side sill inside rear panel 40, a rear side member connecting member 50 and a rear side member 15 are fixed on a jig, and is welded through spot welding.

As described above, the under body for the electric vehicle according to an exemplary embodiment of the present invention may be performed by an assembling process of a under body according to the related art so that mixed production with an existing process is possible.

Accordingly, in the under body for the electric vehicle according to an exemplary embodiment of the present invention, a side sill inside front panel 20 and a front side member connecting member 30 are bonded forward from the side sill inside panel 1 and a side sill inside rear panel 40 and a rear side member connecting member 50 are bonded from reward from the side sill inside panel 1 and a side sill inside rear panel 40 between the front side member 13 and the rear side member 15. During head-on collision, absorption performance of collision energy is improved, and riders and the battery pack 60 may be simultaneously and safely protected.

In addition, although the under body for the electric vehicle according to an exemplary embodiment of the present invention includes additional members, a mounting space of a battery may be ensured at a lower portion of the center floor panel 10, and a cruising range of the vehicle according to durability preservation may be maximized.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An under body for an electric vehicle for forming a mounting space of a battery by assembling left and right side sill inside panels of the electric vehicle on a center floor panel,
   wherein the side sill inside panel is formed therein with a stepped portion to be bent from a top side in a state that the center floor panel is placed in a vehicle height direction, the stepped portion including a first welding surface corresponding to a vehicle width direction, and a second welding surface connected with the first welding to correspond to a vehicle height direction, and first and second end portions of the center floor panel are bonded to the first welding surface and the second welding surface, respectively,
   the under body including:
   a side sill inside front panel bent according to a shape of the side sill inside panel to connect a front end portion of the side sill inside panel with a dash panel to be bonded to each other;
   a front side member connecting member connected with a bottom surface of the dash panel and a rear end portion of a front side member while being bonded to an inside surface of the side sill inside front panel;
   a side sill inside rear panel configured to connect a rear end portion of the side sill inside panel with a rear side member to be bonded to each other; and
   a rear side member connecting member configured to connect a bottom end portion of the side sill inside rear panel with a front inside surface of the rear side member to be bonded to each other.

2. The under body for the electric vehicle of claim 1, wherein the side sill inside panel is formed therein with a plurality of mounting openings spaced apart from each other by a predetermined distance at a bottom surface of the side sill inside panel in a longitudinal direction.

3. The under body for the electric vehicle of claim 1, wherein the side sill inside panel is formed therein with front and rear cutaway portions, and predetermined sections of front and rear end portions of the front and rear cutaway portions are cut.

4. The under body for the electric vehicle of claim 3, wherein the side sill inside front panel has a shape with a predetermined cut section corresponding to the front cutaway portion of the side sill inside panel, and is welded along the front cutaway portion in an overlapped state.

5. The under body for the electric vehicle of claim 3, wherein the side sill inside rear panel has a shape with a predetermined cut section corresponding to the rear cutaway portion of the side sill inside panel, and is welded along the rear cutaway portion in an overlapped state.

6. The under body for the electric vehicle of claim 1, wherein the front side member connecting member is bonded to a bottom surface of the sill inside front panel, a bottom surface of the dash panel, and the rear end portion of the front side member, respectively.

7. The under body for the electric vehicle of claim 1, wherein the rear side member connecting member is spot-welded to a bottom surface of the side sill inside panel, a bottom surface of the side sill inside rear panel, and the front inside surface of the rear side member, respectively.

* * * * *